(12) United States Patent
Zhao (10) Patent No.: US 8,990,172 B1
(45) Date of Patent: Mar. 24, 2015

(54) KEY MANAGEMENT IN SMART PIXEL BASED TRACKING

(75) Inventor: Haixia Zhao, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 266 days.

(21) Appl. No.: 13/565,419

(22) Filed: Aug. 2, 2012

(51) Int. Cl.
*G06F 17/30* (2006.01)

(52) U.S. Cl.
USPC .......................................................... 707/692

(58) Field of Classification Search
CPC ............................................................ G06F 17/30
USPC .......................................................... 707/692
See application file for complete search history.

(56) References Cited

U.S. PATENT DOCUMENTS

| | | | |
|---|---|---|---|
| 8,277,323 B2 | 10/2012 | Sispoidis | |
| 2009/0171721 A1* | 7/2009 | LeBaron et al. | 705/7 |
| 2009/0192866 A1 | 7/2009 | Karnam et al. | |
| 2010/0094878 A1* | 4/2010 | Soroca et al. | 707/748 |
| 2011/0231700 A1* | 9/2011 | Kitajima et al. | 714/15 |
| 2012/0143840 A1* | 6/2012 | Vadon et al. | 707/706 |

OTHER PUBLICATIONS

'RKG' [online]. "Seeing All-Site Sales: Why Smart Pixel Tracking Matters," 2003-2014 [retrieved on Apr. 23, 2014]. Retrieved from the internet: URL<http://www.rimmkaufman.com/case-studies/why-smart-pixel-tracking-matters/>, 2 pages.
Bender, "Inside AdWords: Simpler, more powerful tools to reconnect with your customers—and reach new ones," Jul. 27, 2012 [retrieved on Apr. 23, 2014]. Retrieved from the internet: URL<http://adwords.blogspot.com/2012/07/simpler-more-powerful-tools-to.html>, 2 pages.

* cited by examiner

*Primary Examiner* — Rehana Perveen
*Assistant Examiner* — Alexander Khong
(74) *Attorney, Agent, or Firm* — Fish & Richardson P.C.

(57) ABSTRACT

The disclosed subject matter can be embodied in a method that includes receiving data comprising a user identifier associated with a user and a first set of one or more key-value pairs. A key-value pair includes a key and a value that are based on the user's access of a resource. The method also includes presenting, via a user interface, a second set of keys to a content sponsor associated with the resource. The second set of keys includes one or more keys corresponding to the key-value pairs in the first set. The method further includes receiving, through the user interface, one or more management instructions for managing the one or more keys, updating the first set based on the one or more management instructions, and storing the updated set and the user identifier associated with the updated set in association with the sponsor.

20 Claims, 9 Drawing Sheets

KEY MANAGEMENT IN SMART PIXEL BASED TRACKING

BACKGROUND

This specification relates to information presentation.

An online user's behavior on a website can be monitored in accordance with an applicable privacy policy to determine the user's apparent interests and to facilitate more accurate targeted content delivery. Content items can be selected for presentation to the user based on the user's behavior and interests.

SUMMARY

In general, in one aspect, the subject matter described in this specification can be embodied in a method that includes receiving data comprising a user identifier associated with a user and a first set of one or more key-value pairs. A key-value pair includes a key and a value that are based on the user's access of a resource. The method also includes presenting, via a user interface, a second set of keys to a content sponsor associated with the resource. The second set of keys includes one or more keys corresponding to the key-value pairs in the first set. The method further includes receiving, through the user interface, one or more management instructions for managing the one or more keys, updating the first set based on the one or more management instructions, and storing the updated set and the user identifier associated with the updated set in association with the sponsor.

In another aspect, a system includes a content management and delivery system and a sponsor interface engine. The content management and delivery system is configured to receive data comprising a user identifier associated with a user and a first set of one or more key-value pairs. A key-value pair can include a key and a value that are based on the user's access of a resource. The sponsor interface engine is configured to launch a user interface that presents a second set of keys to a content sponsor associated with the resource. The second set of keys can include one or more keys corresponding to the key-value pairs in the first set. The sponsor interface engine is also configured to receive, through the user interface, one or more management instructions for managing the one or more keys, update the first set based on the one or more management instructions, and store the updated set and the user identifier associated with the updated set in association with the sponsor.

In another aspect, a computer readable storage device has encoded thereon computer readable instructions, which when executed by a processor, cause a processor to perform one or more operations. The operations include receiving data comprising a user identifier associated with a user and a first set of one or more key-value pairs. A key-value pair includes a key and a value that are based on the user's access of a resource. The operations also include presenting, via a user interface, a second set of keys to a content sponsor associated with the resource. The second set of keys includes one or more keys corresponding to the key-value pairs in the first set. The operations further include receiving, through the user interface, one or more management instructions for managing the one or more keys, updating the first set based on the one or more management instructions, and storing the updated set and the user identifier associated with the updated set in association with the sponsor.

Implementations can include one or more of the following features.

The one or more management instructions can include information indicating that a particular key is approved or disapproved by the sponsor. Updating the first set can include deleting the key-value pairs corresponding to the particular key. The particular key can be stored in a separate set of deleted keys. The one or more management instructions can include a correction to a particular key. Updating the set can include modifying the key-value pairs that correspond to the particular key in accordance with the correction. Receiving the one or more management instructions can include receiving, through the user interface, instructions from a sponsor of the resource to define one or more rules using the one or more keys, and generating the rules based on the received instructions. The resource can include content served over the internet. The one or more key-value pairs can be provided by a script embedded within a source code of the resource.

A request for content can be received wherein the request is associated with a particular user identifier. A determination can be made that the particular user identifier is associated with the updated set. Content can be selected and served based on one or more key-value pairs associated with the particular user identifier.

Particular implementations of the subject matter described in this specification can be implemented so as to realize none, one, or more of the following advantages. A content sponsor is able to access a user interface to review and manage key-value pairs associated with the sponsor's resource. Key-value pairs that are approved by the sponsor can be used in creating rules for re-marketing. Incorrect keys (e.g. due to tagging mistakes in the sponsor's resources) can be reviewed and corrected. Random keys that are generated by hackers or malicious competitors can be deleted or at least excluded from the re-marketing rules. A key name can be corrected without losing knowledge of past events connected to the key. In general, key-value pairs associated with a sponsor's resource can be managed and used effectively using the methods and systems described herein.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Generally, a user's receptiveness to content items increases the closer the content item aligns to the interest of a user. The web pages and other online resources that a user visits can be indicative of the user's interest. For example, a user who is visiting a page featuring shoes may be more interested than other users in content involving footwear and other apparel. Content can therefore be provided to users based on interests of the user. For example, a remarketing campaign may provide a user with content based on resources accessed by the user in the past.

In some implementations, user preferences and interests can be determined by analyzing a user's access of an online resource such as a webpage. For example, if a user browses the shoes section of a website selling sports gear, or buys one or more pairs of shoes from the section, information related to the user's activity at the website can be used to determine an interest in sports shoes. This information can be stored in association with the user, for example, using a unique user identification number, and used later in a remarketing campaign for sports shoes or shoes in general.

In some implementations, information related to a user's access of a resource can be collected by the resource using, for example, a software code embedded in the source code for the resource. The embedded software code is sometimes referred to as a smart pixel. For example, a smart pixel can be a JavaScript code embedded in the source code of the resource that is configured to dynamically collect information related to various user activity (e.g., pages viewed, products viewed, number of items added in shopping cart, etc.). A smart pixel can be configured, for example, by the content sponsor's webmaster and implemented across multiple pages associated with the resource, for example, using a footer. In some implementations, a content sponsor (e.g. a website owner) can generate a single piece of code that represents a smart pixel and place the code on multiple pages associated with the website. Using the smart pixels, content sponsors can collect and store (for example, by sending to a marketing server) dynamic variables that can be used to segment users into different remarketing lists by using logic rules. By allowing collection of dynamic variables related to user activities, smart pixels can reduce a need for creating separate codes for different remarketing lists, pages, or resources.

The information that is aggregated using smart pixels can be in the form of key-value pairs. An example of a key-value pair is a set of linked data items that includes a key, which can include a variable identifying a product (e.g., a product name or product ID), and a value identified for the corresponding variable or key (e.g., a descriptive string such as 'Running Shoe,' an alphanumeric string such as 'A1432' or a number). In addition to the keys explicitly defined by the content sponsor, implicit keys (e.g. "URL=") can also be automatically collected, for example, to link the collected information to the page that includes the corresponding smart pixel.

In general, a smart pixel at a resource can be configured to collect key-value pairs based on users' access of the resource and to send the collected information to be stored at a location such as a remote marketing server. In some cases, incorrect key-value pairs can be sent to the marketing server due to various sources of errors. For example, the content sponsor may commit a typographical error in specifying a key name in a smart pixel. In such cases, collected values can be linked to an incorrect key rather than the key for which the values are intended. In another example, a malicious competitor or a hacker, in an effort to disrupt or confuse remarketing strategies of a content sponsor, may succeed in sending incorrect or meaningless keys or key-value pairs to the marketing server. In some cases, such incorrect keys can prove to be detrimental to effective remarketing campaigns or targeted content delivery.

Methods and systems described herein allow a content sponsor to review and manage collected key-value pairs via a user interface and take appropriate actions upon detecting incorrect keys. For example, the user interface can allow the content sponsor to review sets of received keys and approve the keys that are legitimate or correct. The user interface also allows the content sponsor to disapprove incorrect keys such that the incorrect keys are excluded from being used in rules that govern remarketing or targeted content delivery strategies. In some implementations, the user interface also allows the content sponsor to edit or correct errors (e.g. typographical errors) in key names. This allows for information collected under the incorrect key name be used as intended.

This disclosure uses the terms "content sponsor" to refer to the entities that define the smart pixels, as well as manage the key-value pairs through the user interface. However, a content sponsor is not limited to these entities. For example, in some implementations, a content sponsor can be an advertiser or the owner of a website.

Figure 1A:
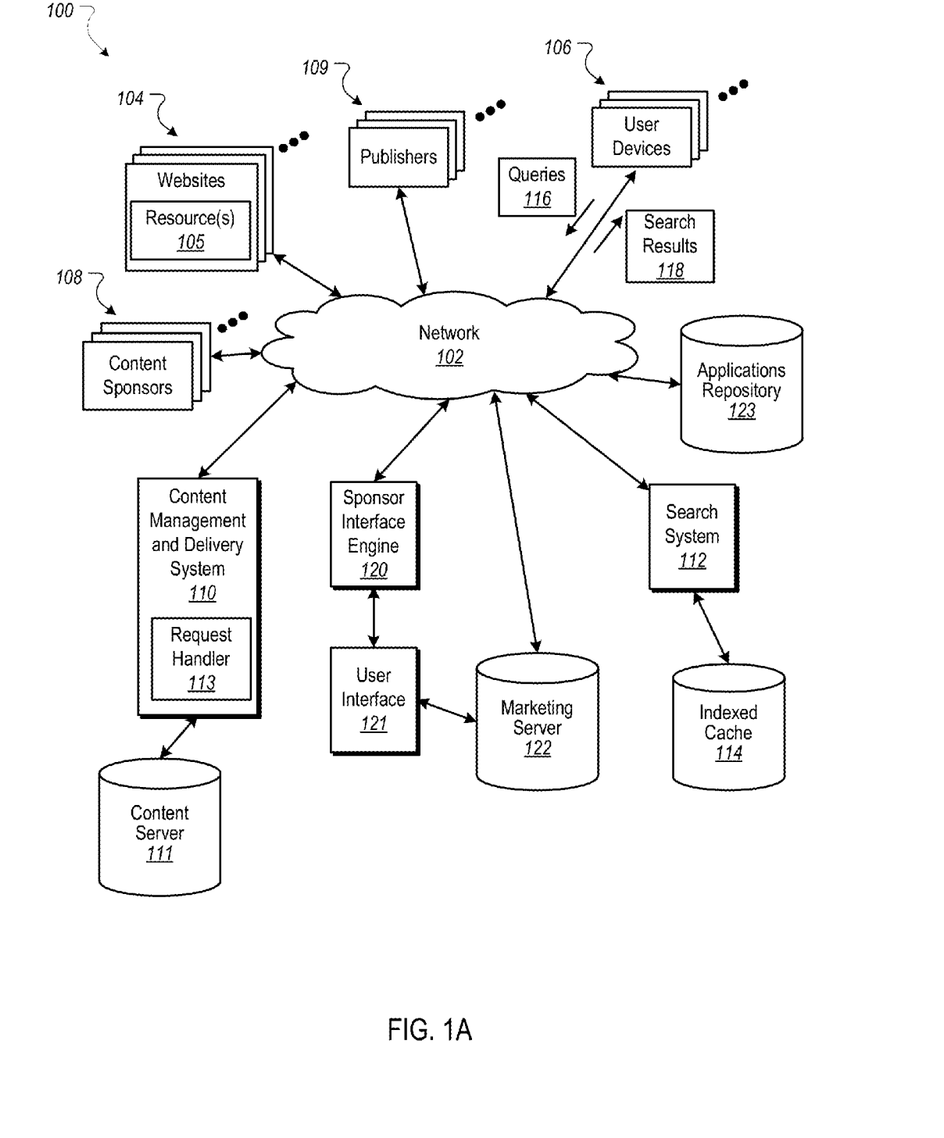
FIG. 1A is a block diagram of an example environment for delivering content.

The systems described herein can be implemented in an appropriate environment. FIG. 1A is a block diagram of an example of such an environment 100 for delivering content. The example environment 100 includes a content management and delivery system 110 for selecting and providing content to user devices 106. The example environment 100 includes a network 102, such as a local area network (LAN), a wide area network (WAN), the Internet, or a combination thereof. The network 102 connects websites 104, the user devices 106, content sponsors 108 (e.g., advertisers or website owners), content publishers 109, and the content management and delivery system 110. The example environment 100 may include many thousands of websites 104, user devices 106, content sponsors 108 and content publishers 109.

In some implementations, the content management and delivery system 110 includes a request handler 113 that can receive a request for content from a user, identify one or more eligible content items, and provide a content item responsive to the request. In some implementations, the content management and delivery system 110 can deliver sponsored contents or campaigns even in the absence of a request for content. For example, the content management and delivery system 110 can be configured to periodically deliver sponsored content (e.g. daily or weekly deals and offers) to user devices 106. In some implementations, the content management and delivery system 110 can provide contents from one or more content servers 111. Contents that are stored in the content server 111 can include, for example, the websites 104, resources 105, sponsored contents such as advertisements and offers, and other contents (e.g. information provided through the search results 118) that are delivered to the user devices 106.

A website 104 includes one or more resources 105 associated with a domain name and hosted by one or more servers. An example website 104 can include a collection of web pages formatted in hypertext markup language (HTML) that can contain text, images, multimedia content, and programming elements, such as scripts. Each website 104 can be maintained by a content publisher 109, which is an entity that controls, manages and/or owns the website 104. In some implementations, a website 104 (or a resource 105 therein) can include a smart pixel to collect information on user activities. In some implementations, the user activity information collected by way of smart pixels can be sent to a server system such as a marketing server 122.

A resource 105 can be any data that can be provided over the network 102. A resource 105 can be identified by a resource address that is associated with the resource 105.

Resources 105 can include HTML pages, word processing documents, portable document format (PDF) documents, images, video, and news feed sources, to name only a few. The resources 105 can include content, such as words, phrases, images, video and sounds, that may include embedded information (such as meta-information hyperlinks) and/or embedded instructions (such as JavaScript scripts or smart pixels). In some implementations, the resources 105 can include sponsored content provided by the content sponsors 108. For example, the resources 105 can include targeted content such as an advertisement, a deal or a special offer sponsored by a content sponsor 108.

A user device 106 can be an electronic device that is under control of a user and is capable of requesting and receiving resources 105 over the network 102. Example user devices 106 include personal computers, televisions with one or more processors embedded therein or coupled thereto, set-top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102. In some implementations, the user device 106 can be configured to execute applications that are configured to receive/generate/manage sponsored or other content and campaigns from the content management and delivery system 110. In some implementations, such applications can include third-party applications that can be downloaded to the user device 106 from an applications repository 123. Sponsored and/or targeted content can also be delivered to the user device 106 through a messaging service such as using text or multimedia messaging. In some implementations, targeted content delivery can be based on user activity information (e.g. as represented by key-value pairs) aggregated at the marketing server 122 using smart pixels placed on the resources 105 or websites 104. The content management and delivery system 110 can communicate with the marketing server 122 to deliver targeted content to the user devices 106.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource 105 or user display are referred to as slots (e.g., ad slots).

When a user accesses a website 104 that includes a smart pixel, the browser on the corresponding user device 106 can transmit smart pixel related information based on the user's activity on the website 104. The smart pixel information can include, for example, data selected by the content sponsor 108 of the website 104, including custom key-value pairs. The data, including the custom key-value pairs, can be provided to, for example, the marketing server that maintains, for example, customer records and remarketing lists. In some implementations, user attribute rules, which can also be managed by the content sponsor 108, can be configured to facilitate storing information about the customer's activities on the website 104. In some implementations, user list rules, which can be created according to the preferences of the content sponsor 108, may add a particular user to one or more user-lists. The content sponsor 108 can use such user-lists to deliver targeted contents to groups of users exhibiting specific preferences or interests.

To facilitate searching of resources 105, the environment 100 can include a search system 112 that identifies the resources 105 by, for example, crawling and indexing the resources 105 provided by the content publishers on the websites 104. Data about the resources 105 can be indexed based on the resource to which the data corresponds. The indexed and, optionally, cached copies of the resources 105 can be stored in an indexed cache 114.

User devices 106 can submit search queries 116 to the search system 112 over the network 102. In response, the search system 112 accesses the cache or index to identify resources 105 that are relevant to a particular search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query, and includes a link to the resource 105. In some implementations, the content management and delivery system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation) and information related to roles.

When a resource 105, search results 118 and/or other content are requested by a user device 106, the content management and delivery system 110 receives a request for content. The request for content can include characteristics of the slots that are defined for the requested resource 105 or search results page, and can be provided to the content management and delivery system 110.

The content management and delivery system 110 can select from the eligible content items that are to be provided to the user device 106 based at least in part, for example, on results of an auction (or by some other selection process). For example, for the eligible content items, the content management and delivery system 110 can receive offers from content sponsors 108 and allocate or prioritize delivery of the content items, based at least in part on the received offers (e.g., based on the highest bidders at the conclusion of the auction or based on other criteria, such as those related to satisfying open reservations). The offers represent the amounts that the content sponsors 108 are willing to pay for delivery (or selection) of their content to a user device 106 either independently or with a resource 105 or search results page. For example, an offer can specify an amount that a content sponsor 108 is willing to pay for each 1000 impressions (i.e., presentations) of the content item, referred to as a CPM bid. Alternatively, the offer can specify an amount that the content sponsor 108 is willing to pay for a selection (i.e., a click-through) of the content item or a conversion following selection of the content item. For example, the selected content item can be determined based on the offers alone, or based on the offers of each content sponsor 108 being multiplied by one or more factors, such as quality scores derived from content performance, landing page scores, and/or other factors.

In some implementations, the selected content item can be determined based on information stored as key-value pairs in the marketing server 122. For example, when users buy various products on a content sponsor's website, a smart pixel can be configured to collect the reference IDs of the products along with the corresponding purchase values. In some instances, the content sponsor 108 may decide to create different remarketing lists based on the purchase values. For example, the content sponsor 108 may choose to bid more aggressively on remarketing to specific users who paid high prices for their products.

A conversion can be said to occur when a user performs a particular transaction or action related to a content item provided with a resource 105 or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable/observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by delivering content that is more likely to be of interest to the user. For example, content items (e.g., ads) that are delivered to a user device 106 can be selected in part based on user preferences represented by key-value pairs, which can also be an indication of how likely the user is to react positively to a content item, e.g., leading to a conversion.

The environment 100 can also include a sponsor interface engine 120 that launches a user interface 121 to allow a content sponsor 108 to approve, disapprove, edit, or otherwise manage key-value pairs that are collected from the content sponsor's resource 105. In some implementations, the key-value pairs are stored in the marketing server 122 and the user interface 121 allows the content sponsor 108 to access the marketing server 122. The user interface 121 can be configured to display collected key value pairs to facilitate a review by the corresponding content sponsor 108. The user interface 121 can also be configured to accept management instructions from the content sponsor 108 to manage the collected key-value pairs. For example, a set of newly received keys can be presented via the user interface 121 to the content sponsor 108 for approval. The user interface 121 can also be configured to receive management instructions from the content sponsor 108 related to the presented keys. In some implementations, the user interface 121 can include selection options (e.g., graphical buttons or checkboxes) associated with the presented keys such that the content sponsor 108 can approve or disapprove one or more keys by selecting or unselecting the corresponding selection option.

Figure 1B:
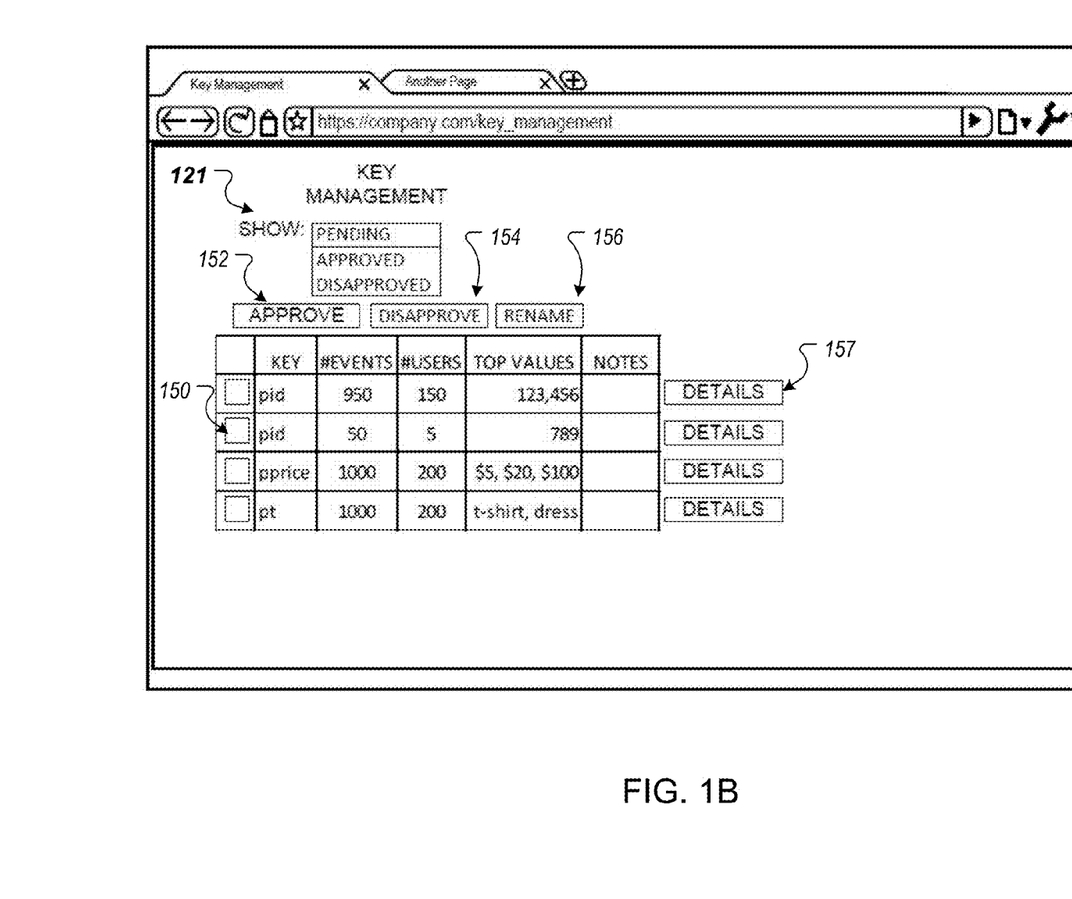
FIGS. 1B-1E are examples of user interfaces for facilitating key management.

FIG. 1B shows one example of the user interface 121. In this example, the user interface 121 is presented as a web-based interface within a browser. However, the user interface 121 can also be presented in other ways, for example, through a dedicated application executing on a computing device. In this example, the user interface 121 includes checkboxes 150 that can be used to select a particular key. The selected keys can then be approved or disapproved using control functions such as the graphical buttons 152 and 154, respectively.

The user interface 121 can also be configured to allow the content sponsor 108 to edit one or more of the presented keys. For example, if a particular key is incorrect due to, for example, a typographical error made during setting up the key, the user interface 121 can allow the content sponsor 108 to correct the error without losing information associated with the corresponding key.

Figure 1C:
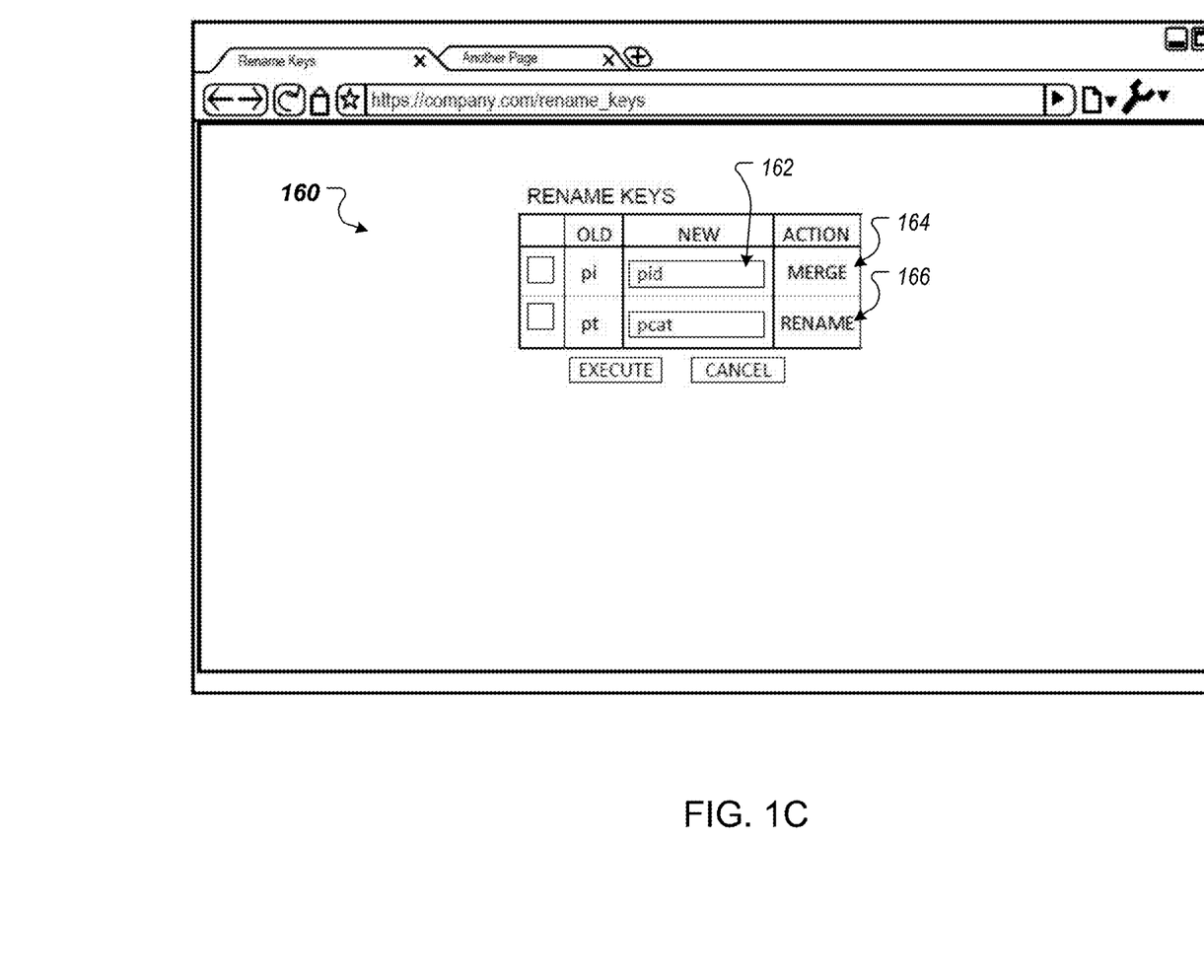

In some implementations, where the content sponsor wishes to correct a particular key, the content sponsor can select a key (for example, using a checkbox 150) and specify a correction or a new name for the particular key via, for example, a control such as the graphical button 156. Clicking or otherwise selecting the graphical button 156 can open another portion of the user interface 121 as a pop-up or separate page 160 as shown in FIG. 1C. The renaming page 160 can include textboxes 162 for renaming one or more of the selected keys.

Figure 1D:
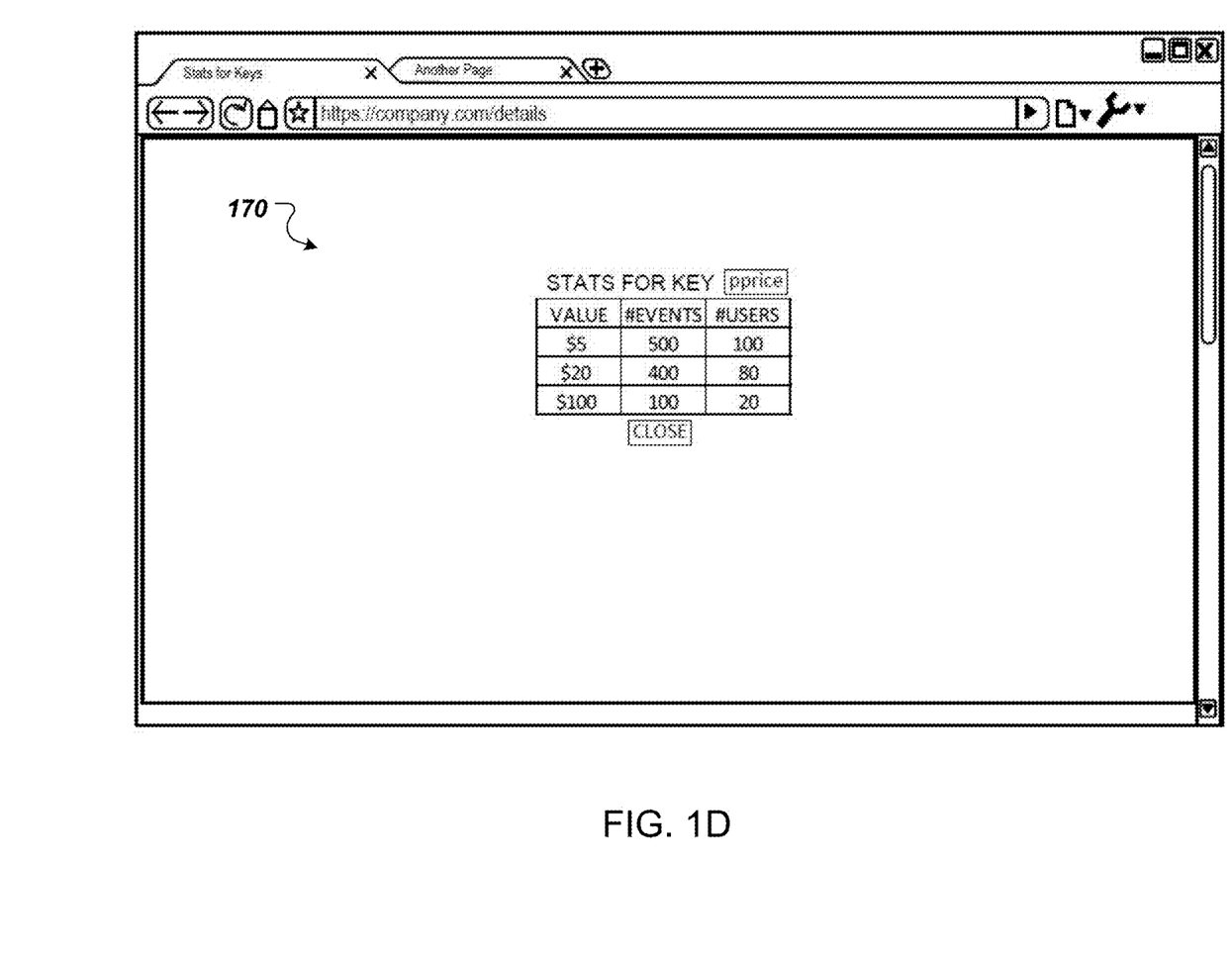

In some implementations, a check may be performed to determine if the new name already exists in the list of keys associated with the content sponsor. If the new name already exists, the user interface can be configured to query whether a merging is being requested. On determining that the content sponsor is not requesting a merge, the new name may be rejected or the content sponsor may be prompted for an alternative name. On determining that the content sponsor is requesting a merge with an existing name or that the new name doesn't already exist, the new name can be accepted and a renaming record created accordingly. In some implementations, the renaming page 160 can include controls, for example graphical buttons 164 and 166, for accepting merging and renaming requests, respectively. In some implementations, details about one or more selected keys can be presented as a separate page 170 as shown in FIG. 1D. The page 170 can be loaded based on, for example, user input through a control (e.g. a graphical button 157) as depicted in FIG. 1B.

Figure 1E:
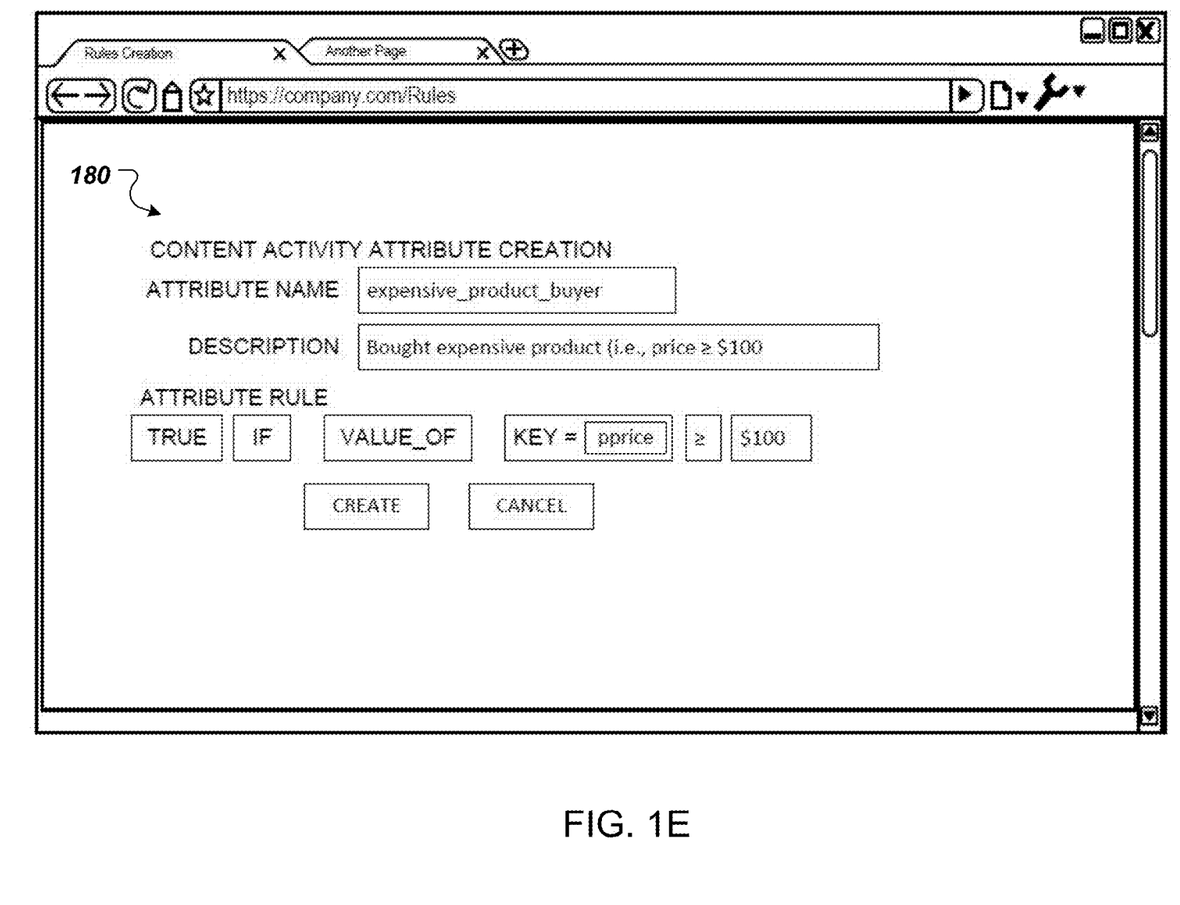

In some implementations, the user interface 121 can also be configured to allow the content sponsor 108 to define one or more rules based on the key-value pairs. Such rule defining can be facilitated, for example, through a rules page 180 as shown in FIG. 1E. In some implementations, only the approved keys and the corresponding values are presented through the user interface 121 for the content sponsor 108 to define one or more rules for remarketing or targeted content delivery. In some implementations, the user interface 121 can also be configured to present a list of previously disapproved keys with an option of approving such keys if the content sponsor 108 chooses to do so.

The user interface can include, for example, a graphical user interface, a browser based interface, or a stand-alone application. In some implementations, the stand-alone application can be downloaded from the applications repository 123.

For situations in which the systems discussed here collect information about user activities, the users may be provided with an opportunity to opt in/out of sharing such information. For example, if a user chooses to opt out of sending key-value pairs that represent the user's activities in a given website, functionalities of the corresponding smart pixels can be deactivated for that user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. In some implementations, users can opt out of being characterized or targeted for content, including advertisements, based on key-value pairs that represent their interest and preferences.

Figure 2A:
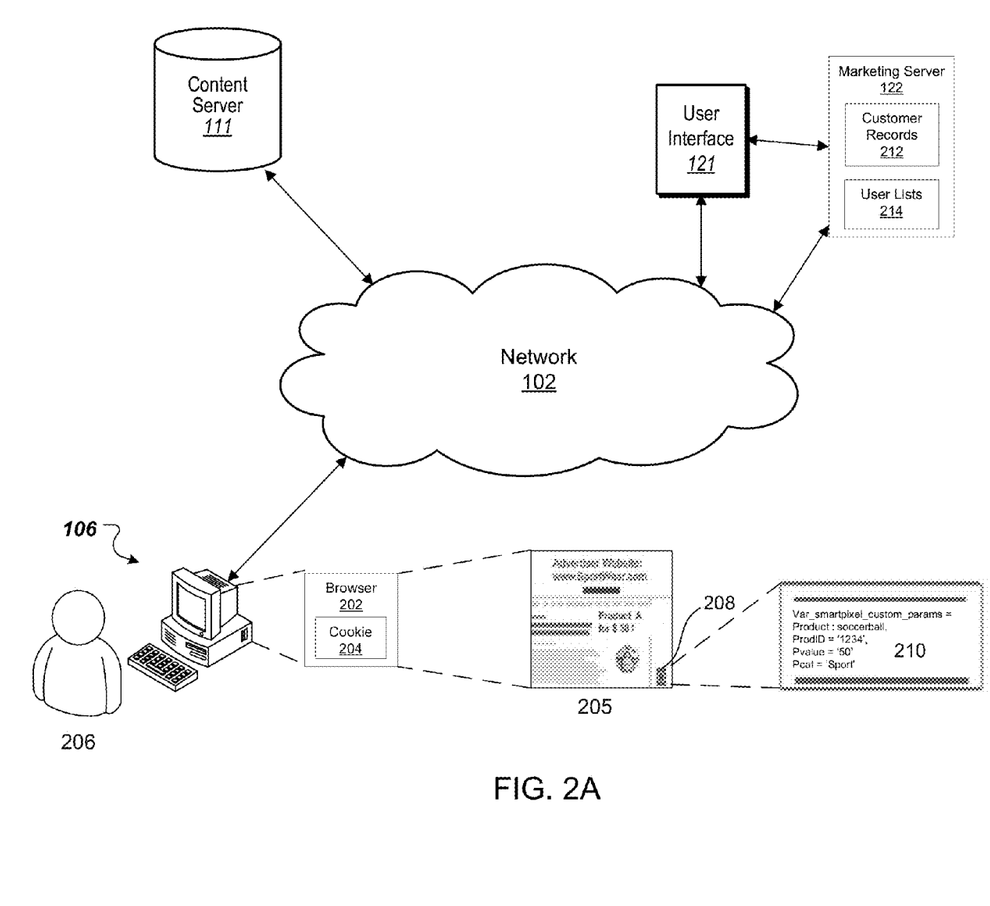
FIG. 2A is a block diagram that illustrates a portion of the example environment of FIG. 1A in additional detail.

FIG. 2A is a block diagram that illustrates a portion of the example system 100 in additional detail to illustrate how internet browsing can lead to collection of user activity as described above. In this example, the user device 106 includes a browser 202. The browser 202 can include a cookie 204 that includes information about the user. The browser 202 is configured to access resources 105 over the network 102 (e.g., the Internet). The browser 202 can request resources 105 from one or more servers over the network 102 to present contents to a user 206.

In some implementations, the browser 202 can access a web page 205 that includes a smart pixel 208. In this example, the web page 205 is a consumer-targeted retail page providing information about a retail product, in this case soccer balls. In order to determine a user's interests, the smart pixel 208 can be designed to convey information related to the user activities on the web page 205 to the marketing server 122 associated with the web page 205. FIG. 2A also shows a portion 210 of source code that represents the smart pixel 208. The code 210 for the smart pixel 208 (generically referred to herein as "the code") can be configured to transmit information back to a server system (e.g., the marketing server 122) or another computing device when the pixel is rendered on a user device 106. The information that is transmitted using the smart pixel includes one or more key value pairs. For example, the code 210 can include data that defines key value pairs associated with the web page 205. In this example, the attribute "Product" is a key, which, for a particular product can be assigned the value "soccerball." In another example, the attribute "ProdID" can be used as a key to represent the corresponding product ID and can be assigned a value such as "1234." The attribute "Peat" can be used to represent a product category and be assigned the value "Sport" to categorize the soccer ball of the present example. In general, keys are typically defined as human readable names such that the information conveyed by the keys is easy to understand.

Figure 2B:
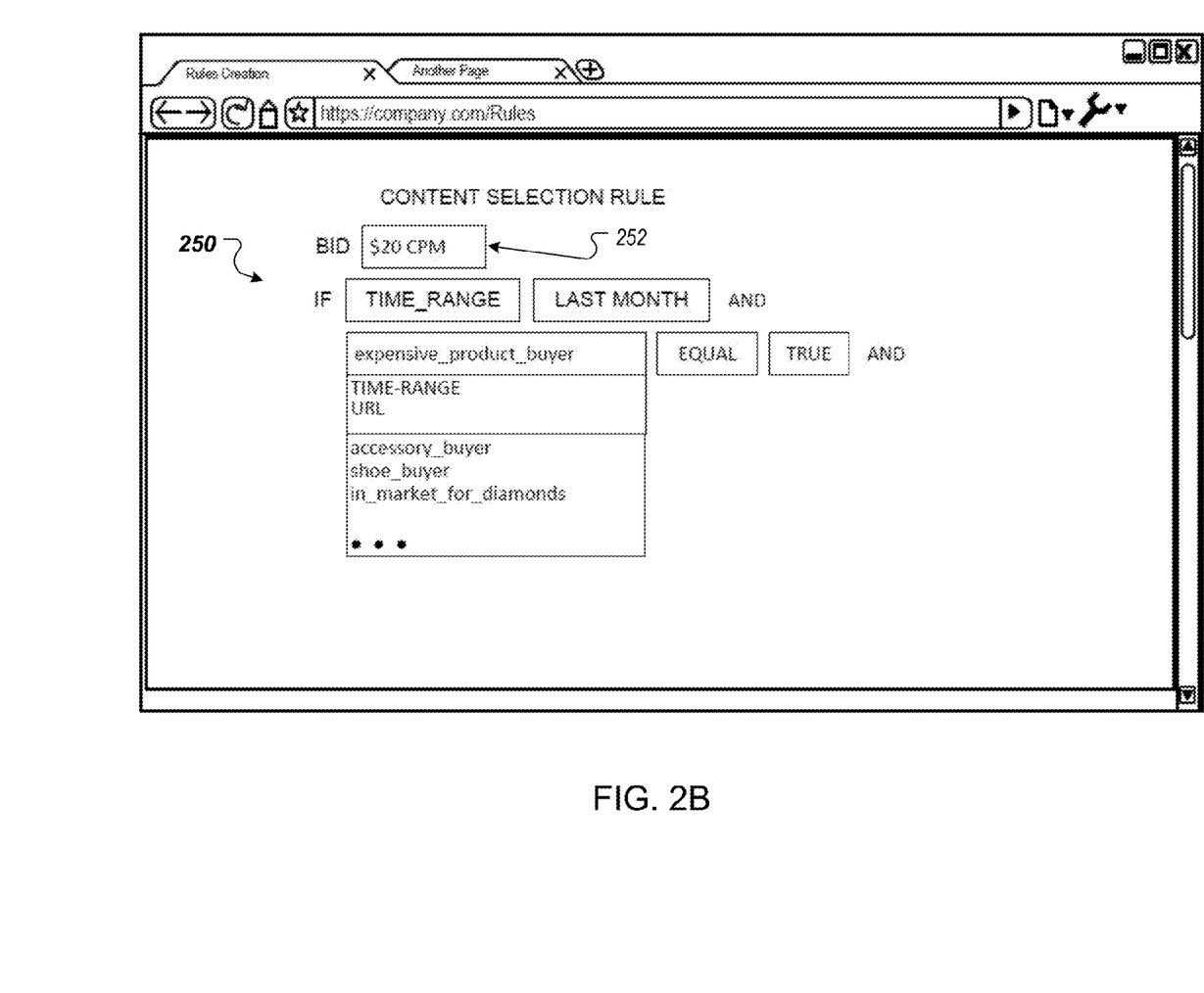
FIG. 2B is an example of a user interface for facilitating content selection.

In some implementations, the keys can be used in audience based advertising as elements of rule-based audience segmentation. For example, the keys can be shown to content sponsors 108 (e.g. through the user interface 121) such that the content sponsor 108 can select and use one or more of the keys in targeted content delivery, remarketing campaigns or bidding. For example, a content sponsor 108 may review the keys presented in the user interface 121 and choose to target a particular women's apparel product at cookies with key value pair "Gender=female". An example of a rules page 250 of the user interface 121 is depicted in FIG. 2B. The rules page 250 can also include a text box 252 for specifying a bid amount if a particular rule is satisfied.

In accessing the web page 205, the browser 202 can send a request to the content server 111 for the content of the web page. The browser can also send information associated with the smart pixel to a marketing server 122. The information sent to the marketing server 122 can include, for example, custom parameters included in the smart pixel code associated with the web page 205. The custom parameters can include key value pairs specified by, for example, the content sponsor 108 associated with the webpage 205, as well as information in the cookie 204 that identifies the user.

In some implementations, the marketing server 122 can include one or more customer records 212 that include, for example, attributes determined based on the users' on-line activities. In this example, when the user 206 accesses the web page 205, the key value pairs provided by the smart pixel 208 are associated with a particular customer record 212 associated with the user 206. The marketing server 122 can also include one or more user lists 214, some of which may include the user 206 based on evaluating the user's attributes.

Figure 3:
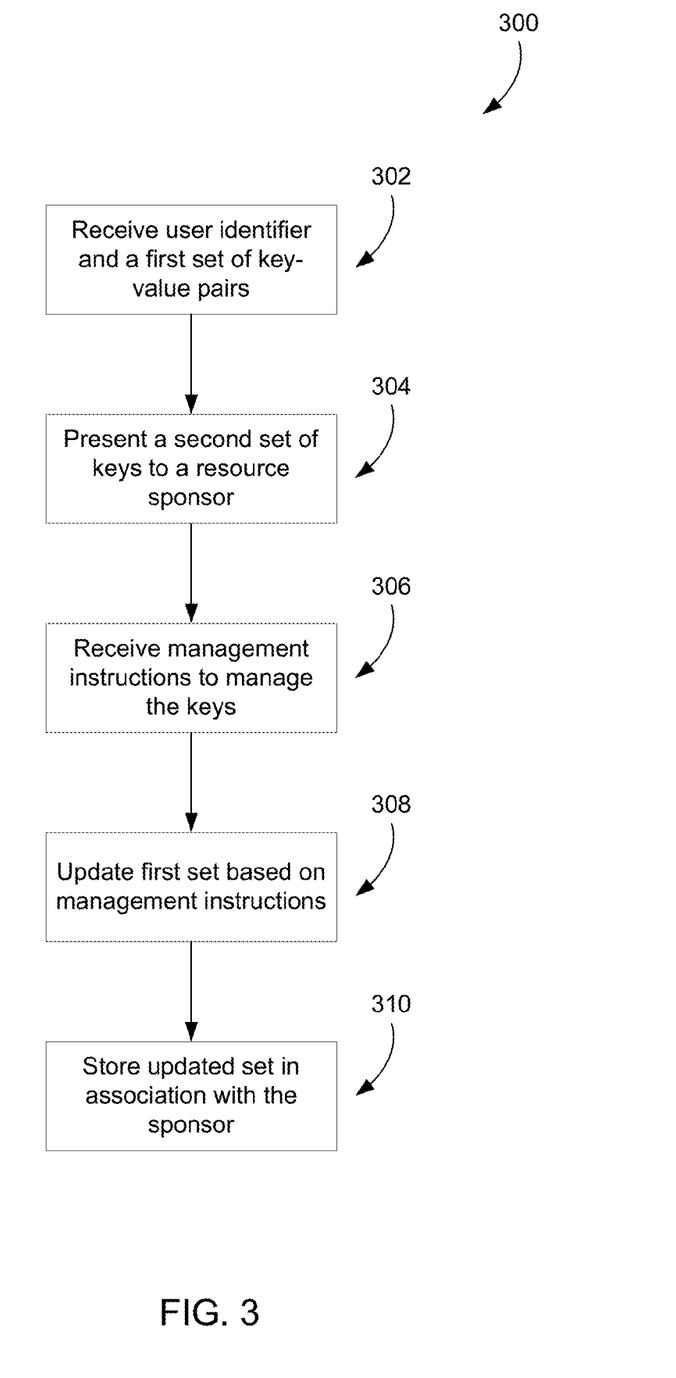
FIG. 3 is a flowchart representing an example process by which a content sponsor can manage collected key-value pairs.

FIG. 3 is a flowchart showing an example process 300 by which a content sponsor can manage collected key-value pairs.

A user identifier and a first set of one or more key-value pairs are received (302). The key-value pair includes a key, which can be an attribute that describes a particular product, and a corresponding value for the key that is based on a user's access of a resource. For example, if the user accesses a web page to buy a running shoe, attributes related to the running shoe such as the corresponding product ID, price, and brand name can be received from the webpage as key-value pairs. In some implementations, the user identifier and the first set of key-value pairs can be received at a particular server such as the marketing server 122. In some implementations, in addition to the first set of key-value pairs, the server may receive or generate additional data such as the page URL, and the timestamp related to the user's access of the resource. The received user identifier and the first set of key-value pairs can be logged and stored in a temporary location for additional processing.

A second set of keys can be presented to a content sponsor (304). The second set of keys includes one or more keys corresponding to the key-value pairs from the first set. In some implementations, the set is presented to the content sponsor through a user interface such as the user interface 121 described with reference to FIGS. 1 and 2. In some implementations, the first set of key-value pairs can be parsed and/or processed to determine the second set of keys that are presented to the content sponsor. For example, even if a particular key appears for a plurality of key-value pairs in the first set, the particular key is included only once in the second set. In another example, a key that has been previously approved or disapproved by the content sponsor, or is included in a pre-defined list of legitimate keys (e.g., system keys), is excluded from the second set. In such cases, keys from the previously approved/disapproved lists and/or the pre-defined list can be automatically approved or disapproved as appropriate. In some implementations, keys from the first set that match disapproved keys, are excluded from the second set but the corresponding statistics are updated and stored separately from approved keys. In some implementations, one or more of the disapproved keys are included in the second set to allow the content sponsor to potentially approve one or more of such keys. In some implementations, keys from the first set that do not match any approved/disapproved or system keys are stored in an intermediate storage location before being presented to the content sponsor.

Management instructions can be received from the content sponsor to manage the keys that are presented as the second set (306). The management instructions can be received through the user interface in which the second set of keys is presented. The management instructions can include, for example, approval, disapproval, or corrections to one or more of the presented keys. In some implementations, the management instructions can also include instructions to define one or more rules based on the keys in the second set of keys. In some implementations, the management instructions can include instructions to delete or rename one or more keys from the second set.

The first set of key-value pairs are updated based on the management instructions (308). For example, if the content sponsor disapproves a particular key from the second set, the key-value pairs in the first set that corresponds to the particular key can be deleted or at least be flagged appropriately such that they are not used in remarketing campaigns or other targeted content delivery. Key-value pairs that correspond to approved keys can be flagged as approved for storing in the marketing server. In some implementations, if a correction to a particular key is received, the corresponding key-value pairs in the first set can be modified by correcting the keys but not modifying the associated values. This way, the key-value pairs can be used for meaningful purposes even though the key was originally incorrect. Depending on whether a merging has been requested by the content sponsor or not, and whether the key is approved or disapproved by the content sponsor, various correction/linkage procedures can be initiated to reflect the updates across various system components. For example, the updates can be reflected in databases related to reporting, cookie segmentation results, and user attribute computations. In some implementations, the original key-value pairs in the first set are stored separately to maintain a log of the events.

The updated set can then be stored in association with the content sponsor (310). In some implementations, information from the updated set may be stored at a server such as the marketing server 122. The updated list can be stored as, for example, a part of a customer record 212 or user list 214 as described above with reference to FIG. 2A. In some implementations, the customer records 212 and/or the user lists 214 may be checked to remove or validate entries with time stamps older than a predetermined time period. This check may occur intermittently, for example, at regular intervals, whenever the list is modified by receipt of additional data, or whenever the list is to be used for remarketing or otherwise referenced.

In some implementations, at least a portion of the process 300 may be implemented at the marketing server 122 described above with reference to FIGS. 1 and 2. In some implementations, the marketing server 122 may be owned by the content sponsor 108. In some implementations, the marketing server 122, customer records 212, and user lists 214 may also be administered by a third party which provides these marketing tools as a service to the content sponsor 108. By providing the user interface 121, the content sponsor 108 is afforded significant flexibility in managing one or more of the keys, the key-value pairs, the customer records, and the user lists without the content sponsor 108 necessarily having direct access to the marketing server 122 or the customer data stored therein.

Figure 4:
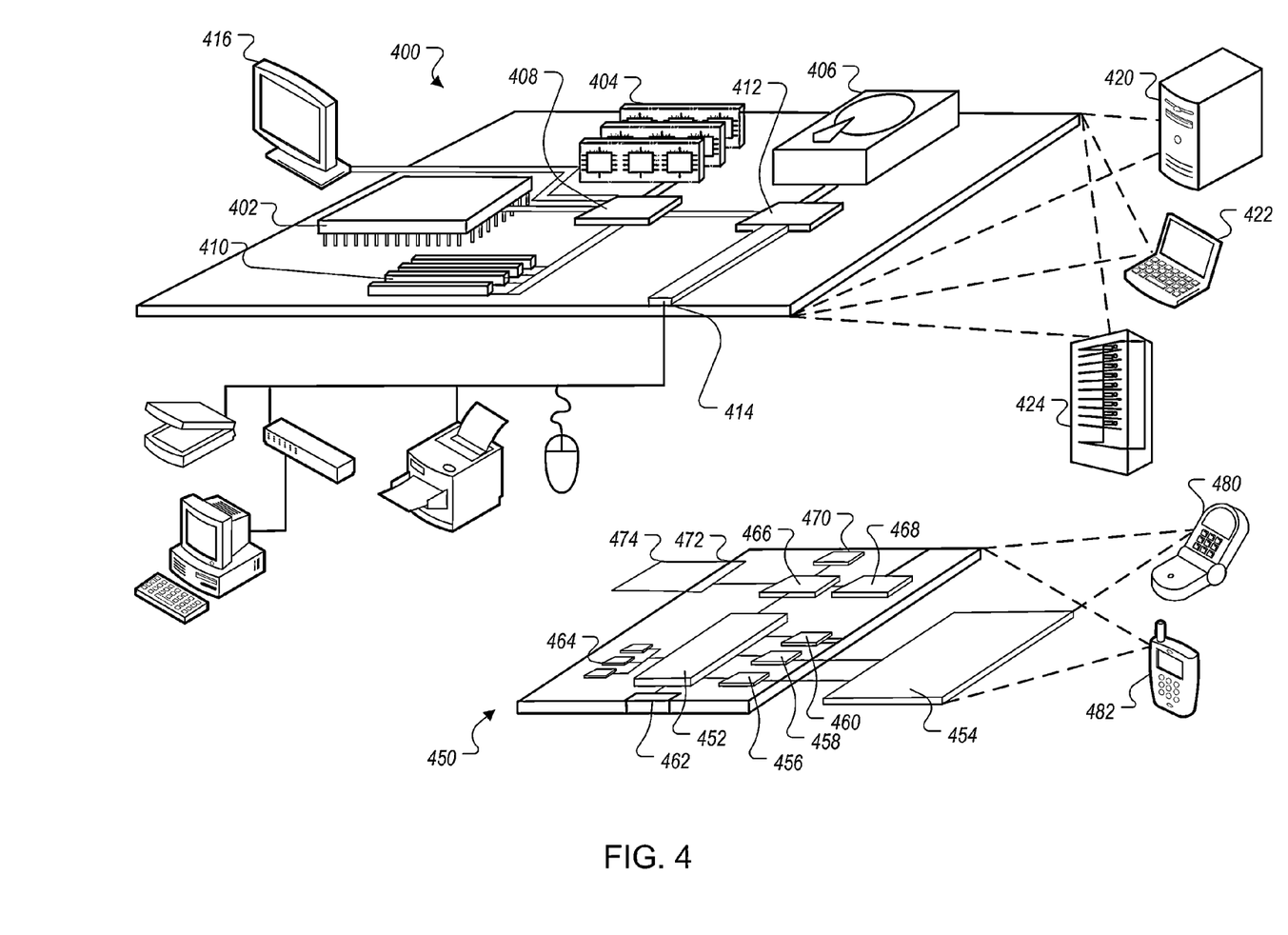
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. For example, one or more of the servers (e.g. the content server 111, and the marketing server 122) can be implemented using components of the computing devices 400 or 450. Similarly, the user interface 121 can be rendered on a computing device substantially similar to one of the computing devices 400 or 450.

Computing device 400 is intended to represent various forms of digital computers, such as laptops, desktops, workstations, personal digital assistants, servers, blade servers, mainframes, and other appropriate computers. Computing device 400 is further intended to represent various typically non-mobile devices, such as televisions or other electronic devices with one or more processors embedded therein or attached thereto. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a single in-line memory module (SIMM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, GPRS, HSDPA, or LTE among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, but does not include a propagated wave. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, over a computer network and from a computing device of a user, data representing a user identifier associated with the user and a first set of key-value pairs, a key-value pair including a key and a value that are based on user access of a resource;
   generating, by one or more processing devices, a second set of keys based on the first set of key-value pairs, wherein generating comprises processing the keys in the first set to exclude one or more of the keys from first set, and wherein the second set of keys comprises one or more keys corresponding to the key-value pairs in the first set;
   presenting, by one or more processing devices and via a user interface, the second set of keys to a content sponsor associated with the resource;
   receiving, by one or more processing devices and via the user interface, one or more management instructions for managing the one or more keys of the second set;
   updating, by one or more processing devices, the second set based on the one or more management instructions to produce an updated set; and
   storing, by one or more processing devices, the updated set and the user identifier associated with the updated set in computer memory and in association with the content sponsor.

2. The method of claim 1, wherein the one or more management instructions comprise information indicating that a particular key is approved by the content sponsor.

3. The method of claim 1, wherein the one or more management instructions comprise information indicating that a particular key is disapproved by the content sponsor.

4. The method of claim 3, wherein updating the first set comprises deleting the key-value pairs corresponding to the particular key.

5. The method of claim 4, further comprising storing the particular key in a separate set of deleted keys.

6. The method of claim 1, wherein the one or more management instructions comprise a correction to a particular key.

7. The method of claim 6, wherein updating the first set comprises modifying the key-value pairs that correspond to the particular key in accordance with the correction.

8. The method of claim 1, wherein receiving the one or more management instructions further comprises:
   receiving, through the user interface, instructions from the content sponsor to define one or more rules using the one or more keys of the first set; and
   generating the rules based on the received instructions.

9. The method of claim 1,
   wherein the resource comprises content served over the internet; and
   wherein the one or more key-value pairs of the first set are received from a script embedded within a source code of the resource.

10. The method of claim 1, further comprising:
    receiving a request for content, the request associated with a particular user identifier;
    determining that the particular user identifier is associated with the updated set; and
    selecting and serving content based on one or more key-value pairs associated with the particular user identifier.

11. A system comprising:
    memory storing instructions that are executable; and
    one or more processing devices to execute the instructions to implement operational components comprising:
       a content management and delivery system configured to receive, over a computer network and from a computing device of a user, data comprising a user identifier associated with the user and a first set of key-value pairs, a key-value pair including a key and a value that are based on user access of a resource; and
       a sponsor interface engine configured to:
          generate a second set of keys based on the first set of key-value pairs, wherein generating comprises processing the keys in the first set to exclude one or more of the keys from first set, and wherein the second set of keys comprises one or more keys corresponding to the key-value pairs in the first set;

launch a user interface to present the second set of keys to a content sponsor associated with the resource;

receive, through the user interface, one or more management instructions for managing the one or more keys of the second set;

update the second set based on the one or more management instructions to produce an updated set, and store the updated set and the user identifier in computer memory and in association with the updated set in association with the content sponsor.

12. The system of claim 11, wherein the one or more management instructions comprise information indicating that a particular key is approved by the content sponsor.

13. The system of claim 11, wherein the one or more management instructions comprise information indicating that a particular key is disapproved by the content sponsor.

14. The system of claim 11, wherein the one or more management instructions comprise a correction to a particular key.

15. The system of claim 11, wherein the sponsor interface engine is configured to:
receive, through the user interface, instructions from the content sponsor to define one or more rules using the one or more keys of the first set; and
generate the rules based on the received instructions.

16. The system of claim 11,
wherein the resource comprises content served over the internet; and
wherein the one or more key-value pairs of the first set are received from a script embedded within a source code of the resource.

17. The system of claim 11, wherein the content management and delivery system is configured to:
receive a request for content, the request associated with a particular user identifier;
determine that the particular user identifier is associated with the updated set; and
select and serve content based on one or more key-value pairs associated with the particular user identifier.

18. A non-transitory machine-readable storage device having encoded thereon machine-readable instructions that are executable by one or more processing devices to perform operations comprising:
receiving, over a computer network and from a computing device of a user, data representing a user identifier associated with the user and a first set of key-value pairs, a key-value pair including a key and a value that are based on user access of a resource;
generating, by the one or more processing devices, a second set of keys based on the first set of key-value pairs, wherein generating comprises processing the keys in the first set to exclude one or more of the keys from first set, and wherein the second set of keys comprises one or more keys corresponding to the key-value pairs in the first set;
presenting, by the one or more processing devices and via a user interface, the second set of keys to a content sponsor associated with the resource;
receiving, by the one or more processing devices and via the user interface, one or more management instructions for managing the one or more keys of the second set;
updating, by the one or more processing devices, the second set based on the one or more management instructions to produce an updated set; and
storing, by the one or more processing devices, the updated set and the user identifier associated with the updated set in computer memory and in association with the content sponsor.

19. The non-transitory machine-readable storage device of claim 18, wherein the one or more management instructions comprise information indicating that a particular key is approved by the content sponsor.

20. The non-transitory machine-storage device of claim 18, wherein the one or more management instructions comprise information indicating that a particular key is disapproved by the content sponsor.

* * * * *